UNITED STATES PATENT OFFICE.

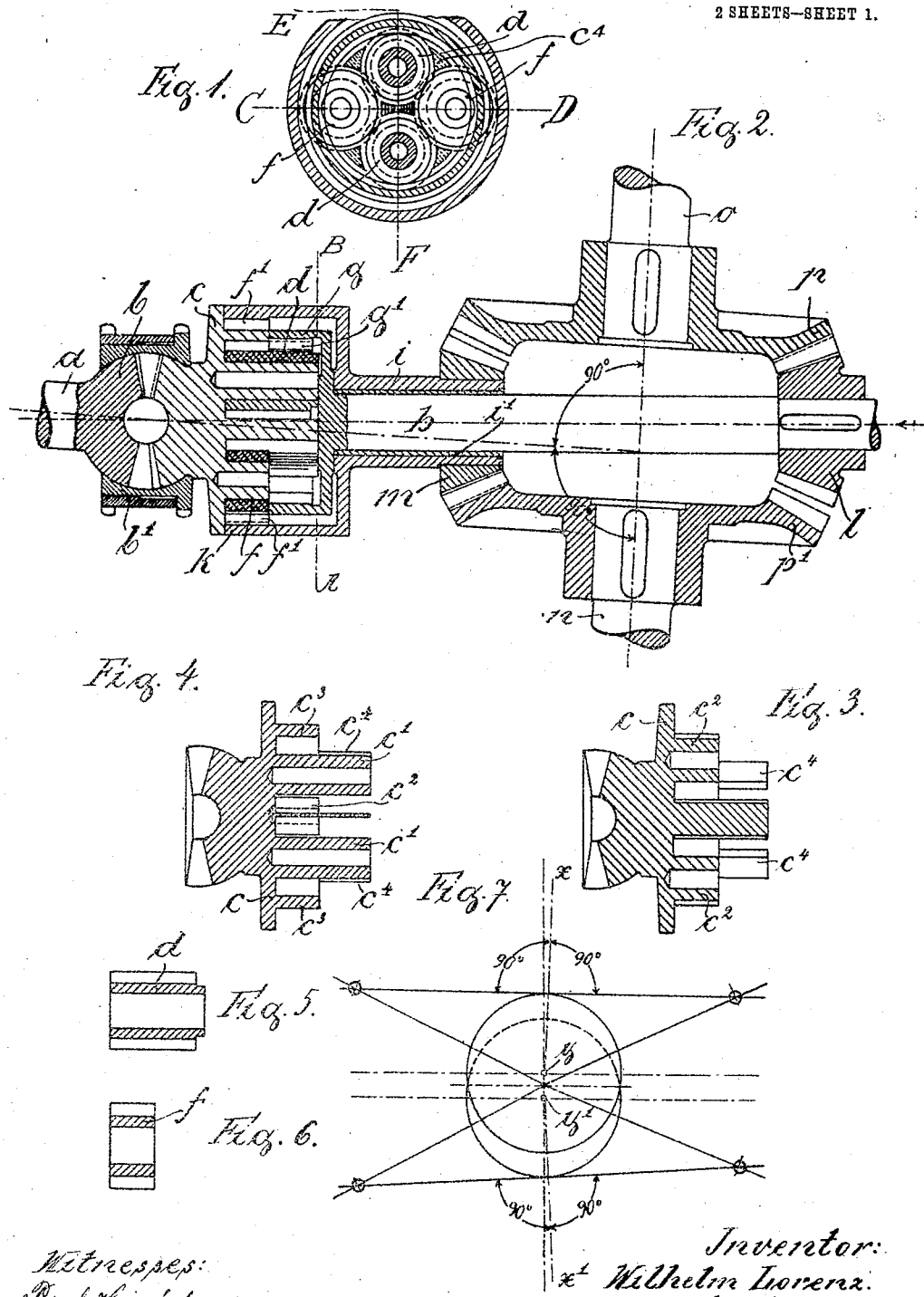

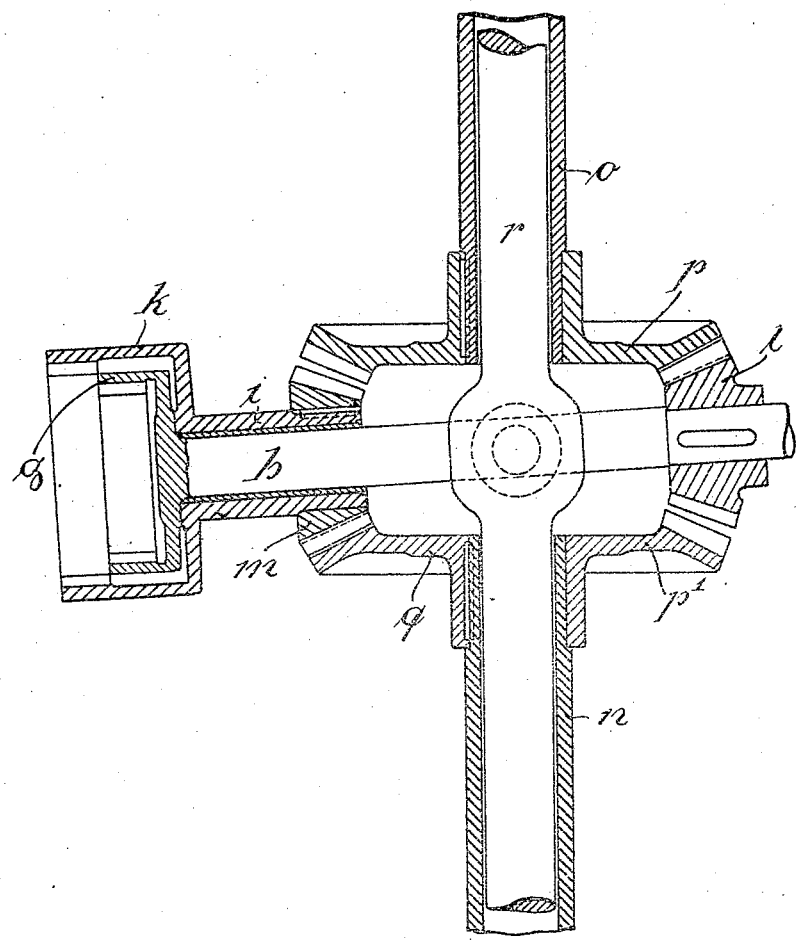

WILHELM LORENZ, OF KARLSRUHE, GERMANY, ASSIGNOR TO DAIMLER MOTOREN-GESELLSCHAFT, OF UNTERTÜRKHEIM, GERMANY.

DRIVING MECHANISM FOR MOTOR ROAD-WHEELS.

No. 915,367.

Specification of Letters Patent.    Patented March 16, 1909.

Application filed March 18, 1907. Serial No. 362,922.

*To all whom it may concern:*

Be it known that I, WILHELM LORENZ, a subject of the Grand Duke of Baden, and resident of 55/61 Kriegstrasse, Karlsruhe, in the Grand Duchy of Baden, German Empire, have invented a new and useful Driving Mechanism for Motor Road-Wheels, of which the following is an exact specification.

This invention relates to self-propelled vehicles and has for its object a new driving mechanism for the divided axles of the road-wheels of the vehicle. It may be observed that this axle will hereinafter be called road-wheel axle and it is well known that in such driving arrangements the motor shaft operates the road-wheel axles by means of a bevel-wheel gear, which has bevel-wheels the diameters of which are of different sizes. The first mentioned bevel wheels engage with bevel-wheels which also have diameters of different sizes. Many inconveniences occur in connection with such an arrangement and structural difficulties are to be overcome in building up motor vehicles having such a driving arrangement. A leading defect consists therein, that the differential bevel-wheels require a large inclosing casing and the power transmitted by the bevel wheels is not alike. In order to avoid these drawbacks according to the present invention the bevel wheels of the differential gear are of equal size and also the bevel wheels arranged on the road-wheel axles are of equal diameters. Owing to this arrangement the same power is transmitted by both the driving bevel wheels and a relatively small casing can be used for inclosing the wheels and mounting the latter therein. Further this arrangement allows the frame and spring supports of the vehicle to be kept low and the stability of the vehicle is thereby increased.

In order to make my invention clear, reference is made to the accompanying drawings, in which:

Figure 1 is a vertical cross section of the driving mechanism according to line A—B of the Fig. 2, Fig. 2 is a horizontal section of the driving mechanism on line C—D of the Fig. 1, Fig. 3 illustrates a detail being sectioned on line C—D of Fig. 1, Fig. 4 illustrates the same detail on line E—F of Fig. 1. Figs. 5 and 6 are two spur-wheels in section, used in connection with the part as shown in Figs. 3 and 4. Fig. 7 shows diagrammatically the driving arrangement in connection with the road-wheels having inclined wheel planes, the illustration being seen in the direction of the arrow in Fig. 2, Fig. 8 is a modification of the construction, in regard to the road-wheel axles.

$a$ is the motor shaft which may be driven in any suitable and known manner from the motor. The globular and toothed end $b$ of the shaft $a$ engages with the correspondingly shaped end of the union-pieces $c$, both ends being mounted in the spherical bearing $b'$. The union-piece $c$ is clearly illustrated in Figs. 3 and 4. On the front side of it there are fitted cylindrical projections or hubs $c'$ $c'$ and $c^2$ $c^2$, the hubs $c'$ $c'$ and $c^2$ $c^2$ being diametrically arranged opposite each other and of different lengths.

$c^3$ are segmental rims and $c^4$ are triangular lugs, both being made integral with the union piece and serving for rendering rigid the structure.

$d$ and $f$ are spur-wheels intended to be mounted on the hubs $c'$ $c^2$ respectively.

$h$ is an intermediate shaft inclined toward the axis of the road-wheel axles $o$ $n$ under an angle which differentiates from 90 degrees. On the shaft $h$ the bevel wheel $l$ is keyed meshing with the bevel wheel $p$ of the axle $o$ and affixed to the latter.

$i$ is a hollow intermediate shaft inclosing the solid shaft $h$ and loosely mounted on the latter by means of the antifriction-shell $1$. On the shaft $i$ is fixedly arranged the bevel-wheel $m$ being of the same size as the wheel $l$ and meshing with the bevel-wheel $p'$ being of equal size with the wheel $p$.

$g$ is a cylindrical casing made integral with the shaft $h$. The casing is provided with inner teeth $q'$, which are in engagement with the spur-wheels $d$ loosely mounted on the hubs $c'$ $c'$.

$k$ is a second casing made integrally with the hollow shaft $i$ and fitted with an inner toothed rim $f'$ engaging with toothed wheels $f$ loosely carried by the hubs $c^2$ $c^2$.

As shown in Fig. 1 the planet wheels $f$ are of larger diameter than the long planet wheels $d$ with which they engage and they are also arranged at a greater distance from the center of the shaft. The broad planet wheels $d$ (Fig. 5) gear with the planet wheels $f$ and with the inner toothed ring $g$ while the larger planet wheels $f$ (Fig. 6), which are not so broad, gear with the internally toothed ring $k$.

This arrangement acts as follows:—The driving motor shaft transmits its motion by means of the union piece c and the spur wheels d d and f f to the shafts h and i respectively. As both the bevel wheels m and l are of the same size they must be prevented from being in engagement simultaneously with both the bevel wheels p and p' and this is due to the inclination of the shaft k toward the axis of the road-wheel axles. The bevel wheel m is permitted to mesh into the wheel p with the teeth on the lower side and the bevel wheel l engages with its teeth on the upper side with the bevel wheel p.

In the diagrammatical illustration of the Fig. 7 x x' are the axis of the road-wheel axles, the plane of which wheels is inclined to the vertical plane. y y' represent the centers of the bevel wheels l and m according to the construction of the Fig. 2, wherein for simplicity of illustration the planes of the road-wheels are indicated as vertical.

In the modification according to Fig. 8 the bevel wheels p and p' are keyed on the hollow shafts o and n respectively, and the latter are mounted on a stationary shaft r which is provided with a hole or passage in its middle allowing the shaft h to pass through. The passage may be adapted to serve as a journal-bearing for the shaft h, but it may be widened so that the latter is enabled to move freely therein.

Having thus fully described the nature of my invention, what I desire to secure by Letters Patent of the United States is:—

1. A driving mechanism for motor road wheels having in combination, a driving shaft intermediate concentrically arranged shafting, a geared connection for said driving and intermediate shafting, bevel wheels of equal diameters on said intermediate shafting, driven shafts, bevel wheels of equal diameters on said driven shafts and each geared to one of said first mentioned bevel wheels.

2. A driving mechanism for motor road wheels having in combination, a driving shaft, two concentrically arranged intermediate shafts, bevel wheels of equal diameters on said intermediate shafts, two driven shafts, bevel wheels of equal diameters on said driven shafts and each geared to one of said first mentioned bevel wheels, said intermediate and driving shafts being inclined to one another at an angle other than a right angle.

3. A driving mechanism for motor road wheels having in combination, a driving shaft, two intermediate concentrically arranged shafts having housings with internally arranged teeth, a planet carrying member coupled to the driving shaft, planet wheels of different diameter on said carrying member and gearing with said internally toothed housings, bevel wheels of equal diameter on the intermediate shafts, driven shafts, bevel wheels of equal diameters on the driven shafts each gearing with one of said first mentioned bevel wheels.

4. A driving mechanism for motor road wheels having in combination, a driving shaft, two intermediate concentrically arranged shafts having housings with internally arranged teeth, a planet carrying member coupled to the driving shaft, planet wheels of different diameter on said carrying member and gearing with said internally toothed housings, bevel wheels of equal diameter on the intermediate shafts, hollow driven shafts, a solid shaft passing through said hollow shafts and inclosing one of said intermediate shafts, bevel wheels of equal diameters on the driven shafts.

In witness whereof I have hereunto set my hand in the presence of two witnesses.

WILHELM LORENZ.

Witnesses:
A. FERRARI,
JESSIE LORENZ.